United States Patent
Van Veldhuisen et al.

(10) Patent No.: US 9,083,971 B2
(45) Date of Patent: Jul. 14, 2015

(54) ALGORITHMS FOR DETERMINING BITRATE FOR A STATISTICAL MULTIPLEXING SYSTEM TO ENSURE STREAM ALIGNMENT FROM ENCODERS TO THE MULTIPLEXER

(71) Applicant: General Instrument Corporation, Horsham, PA (US)

(72) Inventors: Brenda L. Van Veldhuisen, Portland, OR (US); Jing Yang Chen, San Diego, CA (US); Robert S. Nemiroff, Carlsbad, CA (US)

(73) Assignee: ARRIS Technology, Inc., Suwanee, GA (US)

( * ) Notice: Subject to any disclaimer, the term of this patent is extended or adjusted under 35 U.S.C. 154(b) by 99 days.

(21) Appl. No.: 13/664,373

(22) Filed: Oct. 30, 2012

(65) Prior Publication Data

US 2014/0112385 A1    Apr. 24, 2014

Related U.S. Application Data

(63) Continuation-in-part of application No. 13/657,624, filed on Oct. 22, 2012.

(51) Int. Cl.

| | |
|---|---|
| H04N 7/26 | (2006.01) |
| H04N 19/115 | (2014.01) |
| H04N 21/2365 | (2011.01) |
| H04N 19/142 | (2014.01) |
| H04N 19/177 | (2014.01) |

(52) U.S. Cl.
CPC ........... *H04N 19/115* (2014.11); *H04N 19/142* (2014.11); *H04N 19/177* (2014.11); *H04N 21/2365* (2013.01); *H04N 21/23655* (2013.01)

(58) Field of Classification Search
None
See application file for complete search history.

(56) References Cited

U.S. PATENT DOCUMENTS

| | | | |
|---|---|---|---|
| 6,055,270 A * | 4/2000 | Ozkan et al. | 375/240.03 |
| 6,731,685 B1 * | 5/2004 | Liu et al. | 375/240.14 |
| 6,754,241 B1 * | 6/2004 | Krishnamurthy et al. | 370/537 |
| 7,016,409 B2 * | 3/2006 | Unger | 375/240.02 |
| 2003/0235220 A1 * | 12/2003 | Wu et al. | 370/535 |
| 2004/0013136 A1 * | 1/2004 | Mailhot et al. | 370/537 |
| 2005/0058207 A1 * | 3/2005 | Magee et al. | 375/240.26 |
| 2011/0176562 A1 * | 7/2011 | Wang | 370/538 |

OTHER PUBLICATIONS

Sayadi et al., Predictive Encoder and Buffer Control for Statistical Multiplexing of Multimedia Contents, Published on Sep. 3, 2012, IEEE, vol. 58, p. 401-416.*

* cited by examiner

*Primary Examiner* — Hassan Kizou
*Assistant Examiner* — Tejis Daya
(74) *Attorney, Agent, or Firm* — Thomas A. Ward (57) ABSTRACT

A statistical multiplexer (statmux) system for encoding and multiplexing multiple channels of digital television data is provided that limits dropped bits due to misalignment of bit rate allocations to the encoders. Without such a system, if for example an encoder is allotted 0 bits during a first time period and 20 kilobits during a second time period, if the encoder jumps ahead from the first period to the second time period allocation, the 20 kilobits could be output during the 0 bit output allocation time period. This can cause buffer overflow downstream if other encoders are outputting at their maximum rate. To limit such misalignment, a maximum percentage increase of an encoder's bitrate allocation is set from time period to time period based on a formula to prevent bits from being dropped when misalignment occurs.

13 Claims, 7 Drawing Sheets

ALGORITHMS FOR DETERMINING BITRATE FOR A STATISTICAL MULTIPLEXING SYSTEM TO ENSURE STREAM ALIGNMENT FROM ENCODERS TO THE MULTIPLEXER

CROSS REFERENCE TO RELATED APPLICATIONS

This is a Continuation-in-Part of U.S. patent application Ser. No. 13/657,624 filed on Oct. 22, 2012, which is incorporated by reference herein in its entirety.

BACKGROUND

1. Technical Field

The present invention relates to a statistical multiplexer for coding and multiplexing multiple channels of digital television data.

2. Related Art

Digital television has become increasingly popular due to the high quality video image it provides, along with informational and entertainment features, such as pay-per-view, electronic program guides, Internet hyperlinks, and so forth. Such television data can be communicated to a user, for example, via a broadband communication network, such as a satellite or cable television network, or via a computer network. The video data can include high definition (HD) and standard-definition (SD) television (TV).

However, due to the bandwidth limitations of the communication channel, it is necessary to adjust a bit rate of the digital video programs that are encoded and multiplexed for transmission in a single compressed bit stream. A goal of such bit rate adjustment is to meet the constraint on the total bit rate of the multiplexed stream, while also maintaining a satisfactory video quality for each program.

Accordingly, various statistical multiplexers have been developed that evaluate statistical information of the source video that is being encoded, and allocate bits for coding the different video channels. For example, video channels that have hard-to-compress video, such as a fast motion scene, can be allocated more bits, while channels with relatively easy to compress scenes, such as scenes with little motion, can be allocated fewer bits.

In MPEG-2 and MPEG-4 digital video systems, the complexity of a video frame is measured by the product of the quantization level (QL) used to encode that frame and the number of bits used for coding the frame (R). This means the complexity of a frame is not known until it has been encoded. As a result, the complexity information always lags behind the actual encoding process, which requires the buffering of a number of frames prior to encoding, thereby adding expense and complexity. This kind of look-behind information may be avoided by using some pre-encoding statistics about the video, such as motion estimation (ME) scores or a need parameter (NP) to provide a complexity measure. However, the relationship between the pre-encoding statistics of a video frame and the complexity of that frame may not be direct, and sometimes the relationship may change due to the changing subject matter of the source video.

Previous statistical multiplexing systems employed a number of individual encoders that encode data from a number of incoming channels of source video data. The system dynamically allocated bits to the individual encoders to encode frames of video data from the channels. The system used pre-encoding statistics of the source video frames that are closely related to the complexity of the frames, and account for changing content in the source video, to dynamically allocate bits. With more channels included in video content and increasing density of the data in high density systems it is desirable to continue to improve the performance of such multiplexing systems.

SUMMARY

Embodiments of the present invention provide improvements to a statistical multiplexer (statmux) system for encoding and multiplexing multiple channels of digital television data. In particular, the system prevents dropped bits due to buffer overflow when bitrate allocations to encoders are misaligned with the data streams being encoded.

The statmux system according to embodiments of the present invention includes a plurality of encoders, a statmux controller and a multiplexer. The encoders each receive a separate video channel input and provide complexity information for individual video channels to be compressed in the form of a need parameter (NP) to the statmux controller. The statmux controller, or rate control processor, collects the NP data from all the video channels and assigns an encoding bandwidth to each video channel in the form of an encoding bit rate. Each channel encoder receives a different encoding bit rate based on its need parameter in relation to the needs of all the other channels. The encoders use the encoding bit rate to perform video compression and deliver the compressed frames at the assigned bit rate to the multiplexer which combines the channels into a single video signal.

Embodiments of the present invention particularly address setting bit rates for encoders to prevent buffer overflow from resulting in bits being lost that are to be supplied from the encoders to the multiplexer. In some circumstances, the bitrate output allocated to the encoders by the statmux controller for a time period can be misaligned with that time period, causing the bit output to exceed a maximum that will be accepted by components downstream from the encoders supplying the multiplexer. Bits can thus be dropped or left on the floor when such misalignment occurs.

In one example, bit rates are allocated to the encoders in 2 msec time periods. A misalignment refers to when the bitrate allocation for a given 2 msec allocation is applied during the wrong 2 msec time period. So embodiments of the present invention take steps to ensure that the misalignment will not overflow the components downstream from the encoders.

To limit such misalignment, embodiments of the present invention limit the percentage increase of an encoder's bitrate output from time period to time period. This will limit errors during misalignment when large changes in the bit rate allocation occur. For example if an encoder is allotted 0 bits during a first 2 msec time period and 20 kilobits during a second 2 msec time period, if the encoder jumps ahead from the first period to the second time period, the 20 kilobits could be output during the 0 bit output allocation time period. With other encoders using their maximum bit rate allocation, this can overflow buffers downstream. By limiting the bit rate increase for consecutive time periods so that statistically an overflow is unlikely to occur if time periods are misaligned, the dropping of bits is less likely to occur. Accordingly, embodiments of the present invention limit the percentage increase of an encoder's output from time period to time period based on a formula to prevent the bits from being dropped when misalignment occurs.

BRIEF DESCRIPTION OF THE DRAWINGS

Further details of the present invention are explained with the help of the attached drawings in which.

DETAILED DESCRIPTION

I. Statmux System Overview

Figure 1:
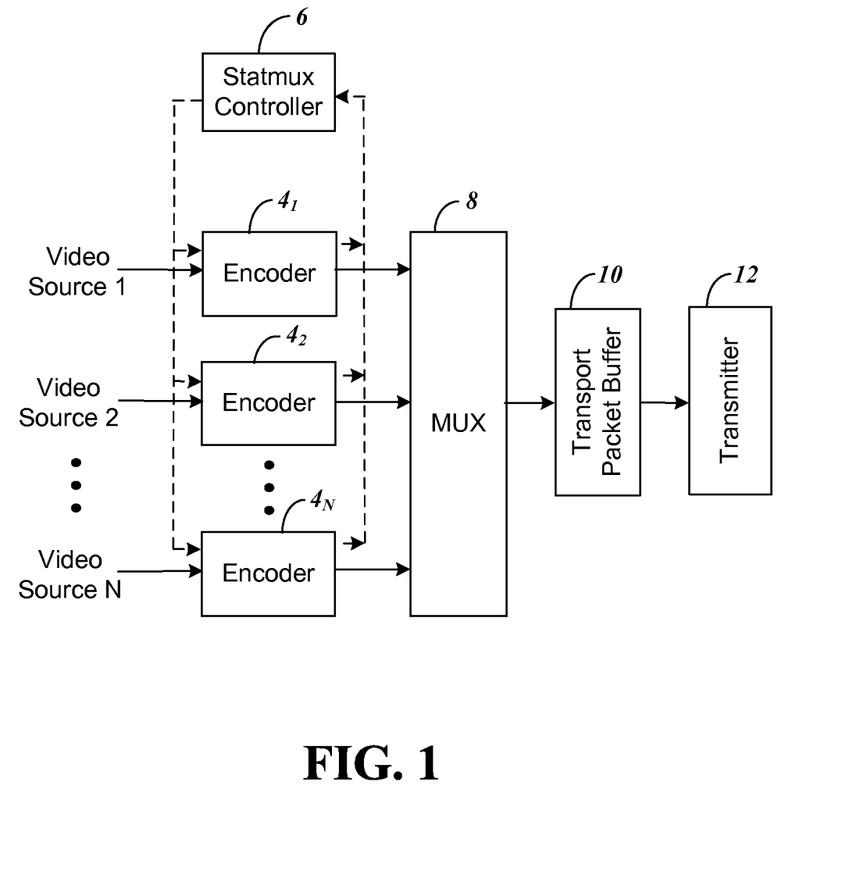
FIG. 1 is a block diagram illustrating a statistical multiplexer (statmux) system.

FIG. 1 is a block diagram illustrating a statistical multiplexer (statmux) system for encoding and multiplexing multiple channels of digital television data. The encoding system of FIG. 1 includes encoders $4_1$-$4_N$ that receive corresponding uncompressed video source inputs 1-N. The encoders $4_1$-$4_N$ provide need parameter (NP) data and clocking information to statmux controller 6 which in turn provides a corresponding encoding bit rate allocation to each of the encoders $4_1$-$4_N$. The statmux controller 6 includes a rate control sequencer that provides a bit rate control signal to the encoders $4_1$-$4_N$ to allocate data to the multiplexer 8 in the most efficient manner.

The encoded data provided to a multiplexer (mux) 8 is combined into a single bitstream that is provided to a transport packet buffer 10. The transport packet buffer 10 then provides the compressed and multiplexed video channels to a transmitter 12 for transmission to a remote receiver that will decode and provide the individual channels to a television or other video display device.

II. Encoders

Figure 2:
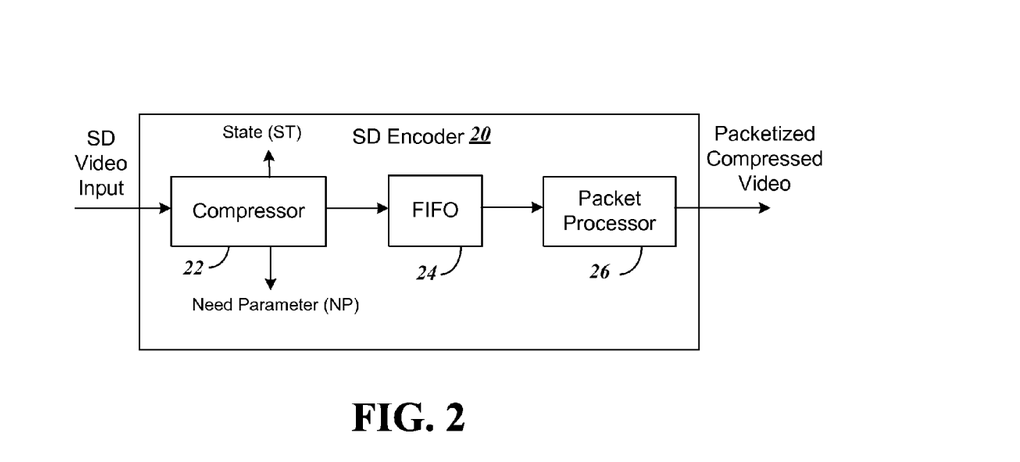
FIG. 2 show a block diagram of components for an standard definition (SD) encoder.

The encoders $4_1$-$4_N$ can be either for standard definition (SD) television or high definition (HD) television. A block diagram of an SD encoder 20 is shown in FIG. 2. A shown, the SD encoder 20 encodes a single channel of SD video input data, and includes a compressor 22 that performs conventional data compression, including motion compensation for P and B frames, discrete cosine transform (DCT) and quantization. A video first-in first-out (FIFO) buffer 24 temporarily stores the compressed data, and a packet processor 26 forms packets of the compressed data with appropriate header information according to MPEG-2, MPEG-4 or another video standard.

Figure 3:
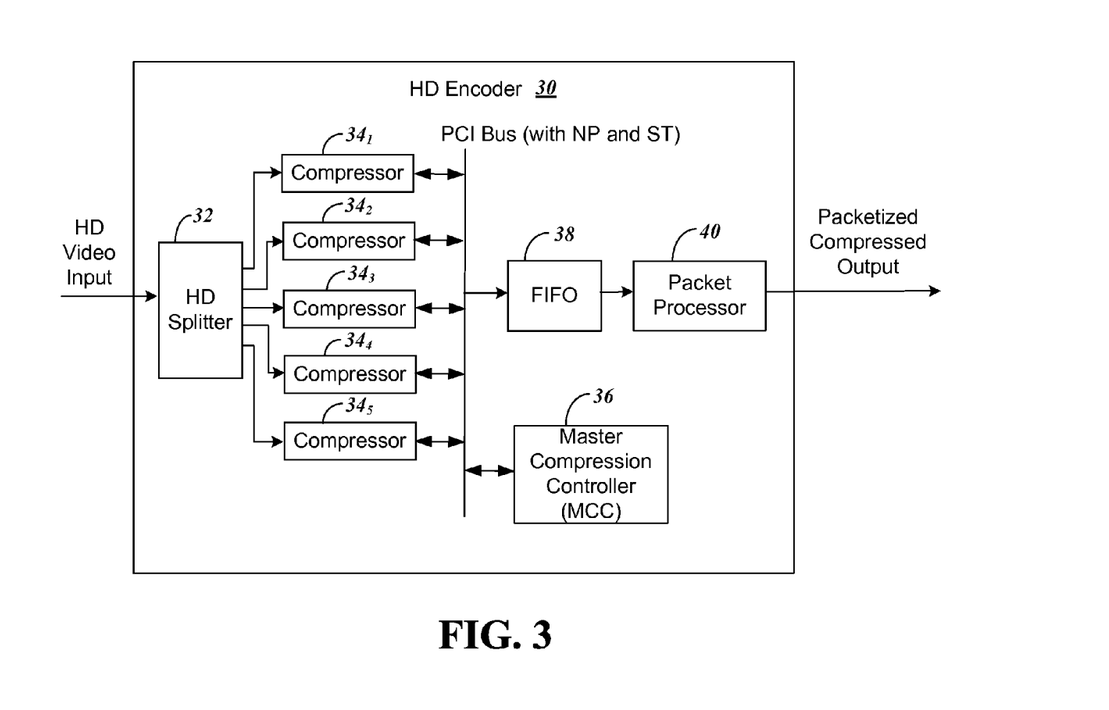
FIG. 3 shows a block diagram of components for a high definition (HD) encoder.

A block diagram of the HD encoder 30 is shown in FIG. 3. The HD encoder also encodes a single channel of HD input video data. However, a splitter 32 divides up a video frame such that different sub-regions, or panels, of the frame are routed through multiple compressors, such as the five compressors $34_1$-$34_5$ shown. A master compression controller 36 (MCC) controls the compression of the data at each compressor $34_1$-$34_5$ via a peripheral component interconnect (PCI) bus, and the compressed data is output to a video FIFO 38 for temporary storage. The compressed data from FIFO 38 is formed into packets for transport at a packet processor 40.

Both the SD encoder of FIG. 2 and the HD encoder of FIG. 3, when connected in a system as shown in FIG. 1, use information from the compressors to provide data such as a Need Parameter (NP) and receive data such as the State (ST) that controls the bitrate output of the compressors. The encoding bit rate for multiple encoders is determined by summing a NP for each of the compressors. Because the statmux controller 6 of FIG. 1 uses the same information to control data output as the MCC 36 of FIG. 3, the MCC 36 of an HD buffer can be used in conjunction with the statmux controller 6, or the statmux controller 6 can be integrated with the MCC 36 as a single device.

Control information such as the NP and ST are exchanged between the encoders and the statmux controller to control the Bitrate Queue (BRQ) in each controller for the system to maximize efficiency. For the NP, each encoder will provide the NP information to the statmux controller 6 to indicate the difficulty of the content being encoded. The statmux controller 6 will then use this NP data to determine what ratio of bits to give each encoder. For ST, each encoder will receive state information from the statmux controller 6. This ST is updated with the BRQ data in regular intervals, for example every 2 milliseconds. The ST information can include a minimum bitrate, nominal bitrate and a command that can be set to hold the bitrate constant. There is a separate BRQ for each encoder that will contain equally spaced bitrates to be applied. As mentioned above, an example of the BRQ application period is 2 milliseconds. In one example to enable efficient operation all PCI bus accesses by the statmux controller and encoders are via writes. No PCI reads are performed, so data is always stored at the destination. Further information about statistical data determination, such as NP and BRQ, are described in more detail to follow.

Figure 4:
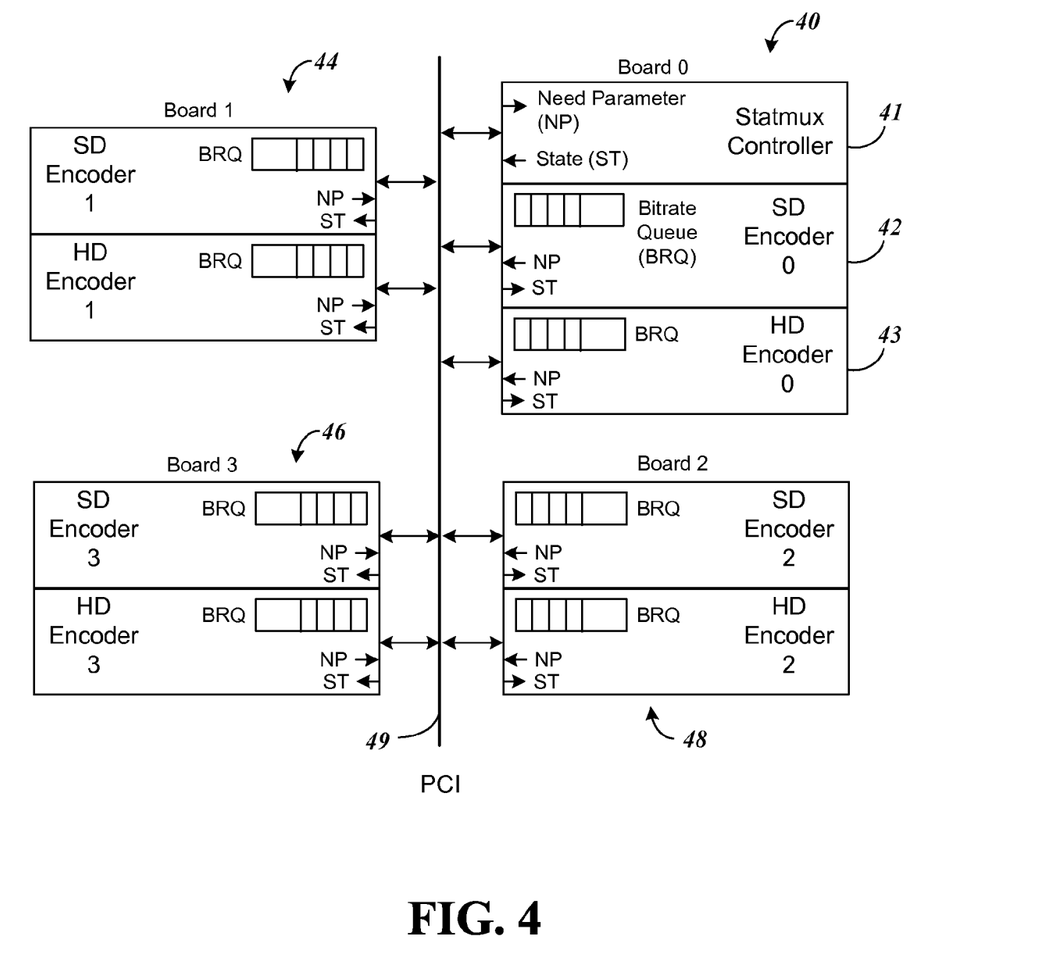
FIG. 4 shows an example of a board layout for a statmux system using both SD and HD encoders.

Both the SD and HD encoders can be combined into a single statmux system, such as that illustrated in FIG. 1. FIG. 4 shows an example of a board layout for such a combined system. The initial printed circuit board 0 with label 40 includes a statmux controller 41, an SD encoder 42 and a HD encoder 43. The statmux controller 41 receives NP information from each of the system encoders over a PCI bus 49 and provides ST information to control the output of each encoder that will be directed in a most efficient manner into a single bit stream. The SD encoder 42 then receives the ST information and provides NP data to the PCI bus 49 to enable control of the bit rate queue (BRQ) in its compressor. The HD encoder 43 will have multiple compressors, but similar to the SD encoder 42 receives ST information from the statmux controller 41 over the PCI bus 49 and provides NP data to enable control of its BRQ that is internally formed from the combined output of the multiple compressors.

The system of FIG. 4 further includes other boards 44, 46 and 48 that likewise include both SD and HD encoders. The encoders on the boards 44, 46 and 48 communicate NP and ST data with the statmux controller 41 to enable a single data stream to be provided by combining the outputs of all encoders in the system in the most efficient manner.

III. Need Parameter (NP)

A key part of a statistically multiplexed multi-channel encoding system of the invention is the calculation of NP. The visual characteristics and complexity information regarding the source video are collected and condensed into this single parameter, which is referred to as the "need parameter." The NP is calculated for each video channel, and is updated once per frame whenever a new video frame is processed by an encoder. Optionally, the NP can be updated more often, such as multiple times per frame. Moreover, for field-picture mode, the NP can be updated once per field.

The current frame motion estimation (ME) scores, average frame ME scores and current frame activity are preferably directly applied in the calculation of the NP. Optionally, a table look-up may be used. The NP calculation functions in an encoder provide the NP according to the current picture type in the beginning of a new frame (such as HD or SD), and pass the NP to the statmux controller. The NP must arrive at the statmux controller no later than, e.g., two quantization level/bit rate (QL/BR) cycles before the start of the slice encoding at the encoder. This lead time ensures the statmux controller has enough processing time for bandwidth allocation.

During operation of a statmux system, such as illustrated in FIG. 1, each encoder is assumed to provide a picture complexity measure to enable calculation of the NP, such as an ME score or activity level, to the statmux controller 6. This enables the statmux controller to handle the tasks of allocating bandwidth for each television service provider (TSP), e.g., channel, and modulating the transmission rates for each channel. In an encoder with look ahead capability, the ME score can be replaced by other measurements such as the actual number of bits coded under a constant quantization level (QL).

For the high-definition encoder that processes multiple panels of a frame in parallel, such as illustrated in FIG. 3, the encoders $34_1$-$34_5$ collect the ME scores from all the panels and compute the sum along with other parameters such as Average Pixel Level (APL), picture resolution, frame rate, frame type (I, B or P) and total intra-frame activity. The encoders also keeps a record of the sizes and average QL for past frames. Based on the information available, plus the look ahead buffer parameters including scene change, fade and film detection, the statmux controller can derive a total NP for that video channel.

As the statmux controller 6 receives updated NP data, it reallocates the bandwidths for all the video services based on the latest information. The bandwidth allocation is sent back to each encoder, such as $4_1$-$4_N$ of FIG. 1, in the form of an encoding bit rate or state ST. The encoders use the ST bandwidth allocation to compute bit budgets for encoding for the bitrate queue (BRQ).

The statmux controller keeps an approximate Video Buffering Verifier (VBV) model for each encoder, such as is known from the MPEG standard, to ensure that each frame from each encoder is encoded within acceptable size limits. The VBV model is only approximate because the actual transmission rate changes that occur at the decode time of a frame cannot be precisely modeled in advance, at the time of encoding. The statmux controller 6 also keeps a bit accurate model of the BRQ, and calculates the minimum and maximum limits on the transmission rate before any transmission rate change is issued. Since all the video services need not be frame-synchronized, the encoding bit rates and transmission rates are updated as frequently as the statmux controller 6 can handle.

IV. Bitrate and Timing Considerations

Figure 5:
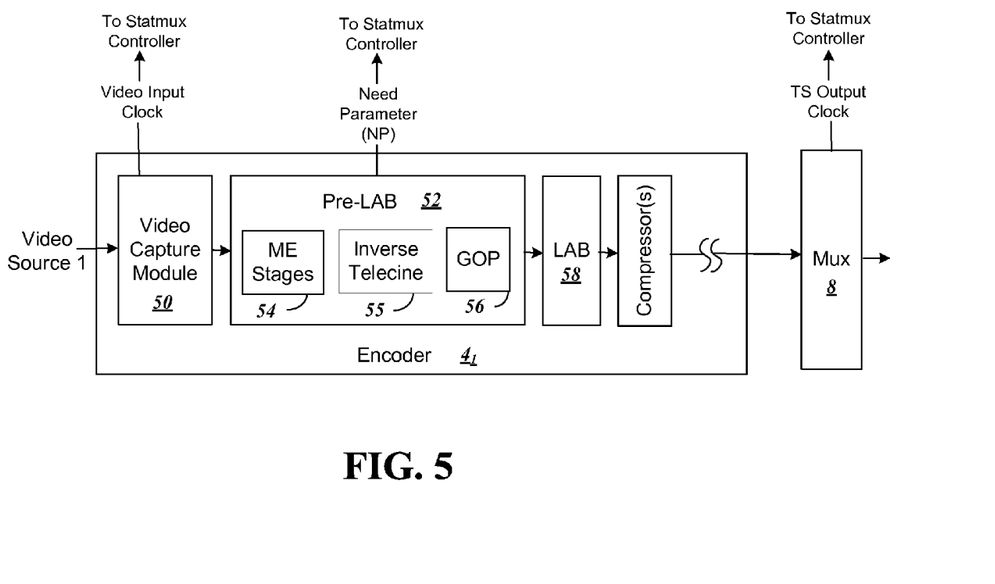
FIG. 5 shows details of components of an encoder of FIG. 1, along with its connection to the multiplexer of the statmux system, for purposes of illustrating timing data.

FIG. 5 shows further details of input components of an encoder of FIG. 1, along with its connection to the multiplexer (mux) 8, for purposes of illustration of timing data. For reference, FIG. 6 further provides a timing diagram to illustrate signals to and from the components of FIG. 5 and how those signals are interrelated.

Initially, the encoder $4_1$ includes a video capture module 50. The video capture module 50 provides a Video Input Clock signal, illustrated in FIG. 5, to the statmux controller 6. The video input clock is generated from the field interrupts in the video capture module 50.

The encoder $4_1$ further includes a Pre-Look Ahead Buffer (Pre-LAB) 52 that receives the output of the video capture module 50. The PreLAB 52 includes a few pipeline states before a frame is placed in the Look Ahead Buffer (LAB) 58. These stages include some early Motion Estimation (ME) stages 54, Inverse Telecine stage 55 to transfer cinema signals to television, and the Group of Pictures (GOP) stage 56. The ME stage 54 is provided in addition to the ME stage information from the compressor of the encoder $4_1$ and is used to determine the NP that helps the statmux controller 6 determine bandwidth need for the individual signal prior to encoding.

The output of the Pre-LAB 52 is provided to the Look Ahead Buffer (LAB) 58. The LAB 58 will buffer a fixed number of frames, for example a fixed 30 frames, regardless of the input format. With a fixed 30 frames, the clock timing of the LAB 58 will be different when 30 frames per second (fps) vs. a 60 fps output is desired.

Figure 6:
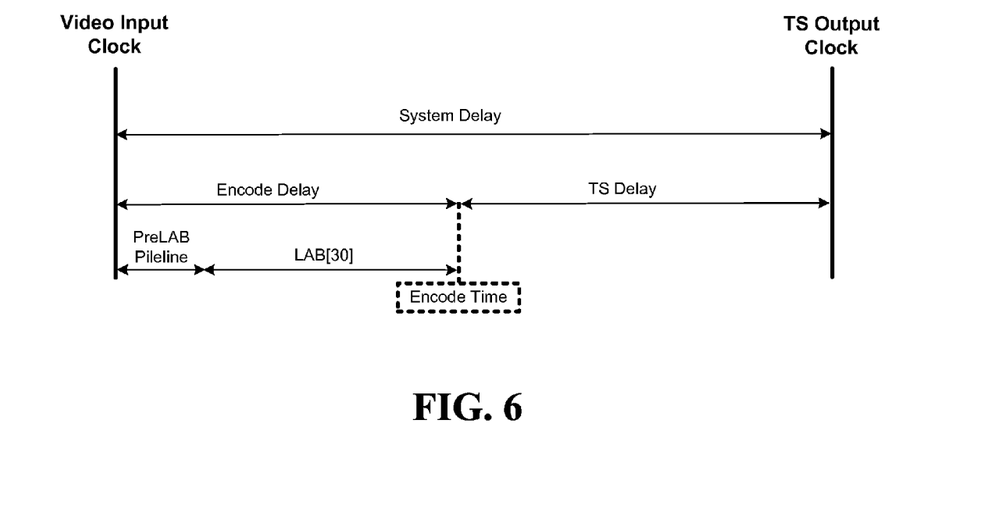
FIG. 6 provides a timing diagram to illustrate signals to and from the components of FIG. 5.

The output of the LAB 58 is provided to the compressor and other components of the encoder $4_1$. The final output of encoder $4_1$ is then provided to multiplexer 8. The multiplexer 8 provides a Transport Stream (TS) Output Clock that clocks the output packets from the multiplexer 8. The TS output clock, as shown in FIG. 6, is synchronized to the video input clock from the video capture module 50, and is set to the Program Clock Reference (PCR) time of the next packet to be generated by the multiplexer 8. As further illustrated in FIG. 6, the TS output clock is offset from the video input clock by the total "System Delay," which always remains constant.

Other time references relative to the video input clock and the TS output clock are also illustrated in FIG. 6. First, the "Encode Delay" is defined as the delay between when the picture is captured to the time the picture is encoded by the encoder. The delay of the PreLAB pipeline 52 and LAB 58 together make up the total encode delay. The delay caused by the compressor is illustrated by the dotted lines in the box labeled "Encode Time" in FIG. 6. Finally, a "TS Delay" is the portion of the system delay that does not include the encode delay or encode time. The TS delay can be described as the time difference between the Presentation Time Stamp (PTS) of the frame to be encoded and the TS Output Clock.

V. Encoder State Machine

Figure 7:
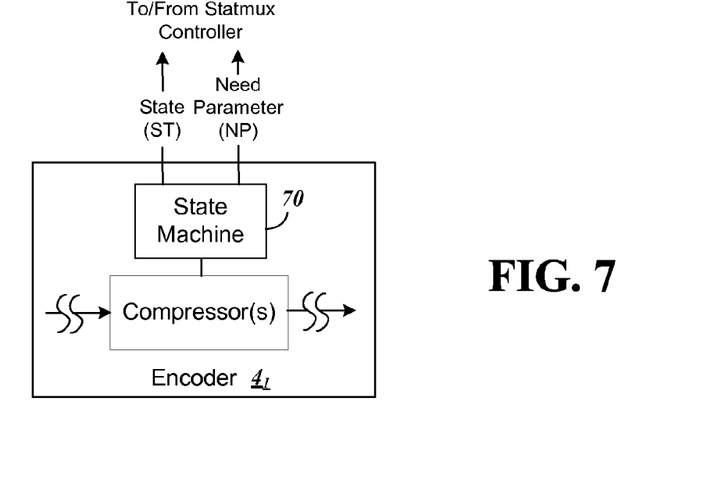
FIG. 7 illustrates a state machine included in the encoder components of FIG. 5.

FIG. 7 illustrates a state machine 70 included in the encoder $4_1$ in addition to those components of the encoder shown in FIG. 5. The state machine 70 sets the transmission stream (TS) bit rate for each compressor output from an encoder. The state machine 70 receives the ST information from the statumux controller 6 over a PCI bus to set the output bit rate. The state machine also provides the NP to the statmux controller over the PCI bus. The SD encoder includes a single compressor, as shown in FIG. 2, and will include a single state machine for the controller similar to that shown in FIG. 7. For a HD encoder that includes multiple compressors as shown in FIG. 3, the state machine can be the MCC or a separate device that communicates with the MCC.

Figure 8:
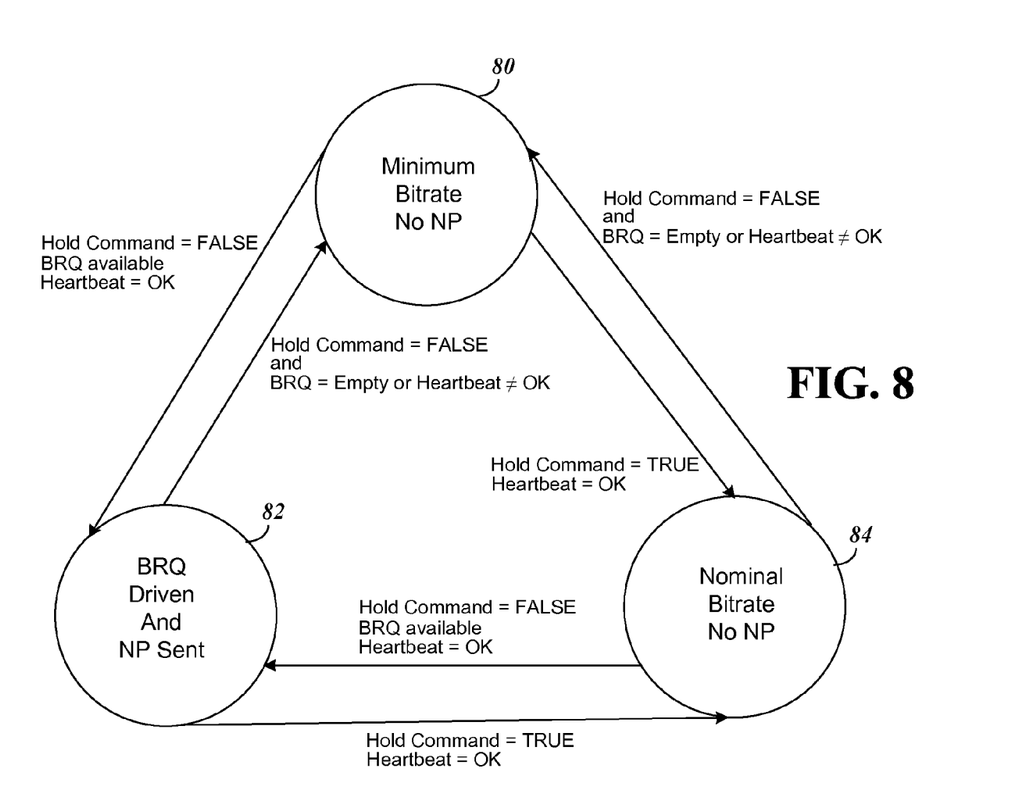
FIG. 8 shows a flow diagram for the state machine of FIG. 7.

FIG. 8 shows a flow diagram for the state machine 70. The state machine function illustrated in FIG. 8 has three states 80,

82 and 84. The first state 80 is a "Minimum Bitrate no NP" data state. In this first state 80, which occurs at startup, the state machine controls the encoder to operate at a minimum bitrate while it waits for the statmux controller to start sending bitrates. The encoder state machine will not send NP data during this first state 80. The encoder state machine will not send data (or speak) until it is spoken to. This ensures that the statmux controller is ready to receive PCI traffic. The encoder will return to this minimum bitrate state 80 if for any reason the encoder is no longer healthy (heartbeat≠OK) and is hence waiting for a reboot.

The second state 82 is the "Bitrate Queue (BRQ) Driven and Need Parameter (NP) Sent" state. In state 82, the encoder state machine will transition to the BRQ driven state and start sending NP data to the controller once the encoder starts receiving bitrates. The encoder only sends NP data to the statmux controller when it is receiving BRQ data.

The third and final state 84 is the "Nominal Bitrate No NP" state. This nominal bitrate no NP state 84 is entered when a Hold command is sent by the statmux controller. The hold command is only used when the statmux controller is ceasing to function for any reason, such as when it is recovering from a failure. In the hold state all encoders in the system are sent to a nominal bitrate while the statmux controller is rebooted. No NP data should be sent by the encoders in this state. To prevent errors, the encoders should not transmit on the PCI bus while the controller is recovering.

Appendix A shows an example of C++ code used for allocation of bitrates to individual encoders by the statmux controller. Initially in the code a total bits to allocate variable (bits_to_allocate) is set and the NP is initialized to zero. The remaining code will cause the statmux controller to allocate bits for each time slot (e.g. every 2 ms) based on the current NP value for each encoder.

Under the heading "Compute the total NP and assign a minBitrate to all channels" the code of Appendix A computes the total NP from the values provided by the encoders and then assigns a minimum bit rate to each channel formed by the output at each encoder. Each encoder will first receive its minimum bitrate allocation of bits for the next available time slot after the time slot being processed.

Next under the headings "Allocate remaining bits based on complexity" and "Looping to handle case where channels hit max bitrate," the remaining bits available (of the original total) are allocated to each of the encoders in a linear mapping based on the NP received from that individual encoder. If an encoder then receives more bits than the maximum bitrate for that encoder, those bits are then given to the other encoders in a second iteration of the linear mapping.

VI. Need Parameter Modifications

Embodiments of the present invention provide for an improved determination of NP. The embodiments described take into account factors such as scene changes, and difficult frames that are identified in the video data provided for encoding.

A. Scene Change

After determining that a scene change will occur, the coded ratios stored in an encoder may not provide accurate determination for complexity that is provided as part of the NP data for the statmux controller. In the past, when determining a complexity the encoder looked only at the current picture and previous picture history. If a new scene is significantly more complex and requires a higher bit rate, the data complexity determination based only on current or previous data may not be adequate.

Discussion of a complexity determination will be made with respect to Appendix B, which includes C++ program code. The code of Appendix B is provided as an example to accomplish detection of a scene change and provide statistical information for the NP to enable controlling bit rate for an encoder. Also, reference will be made to FIG. 9 which provides a flow chart showing steps for determining complexity values for the NP to be provided from an encoder when a scene change is detected.

Figure 9:
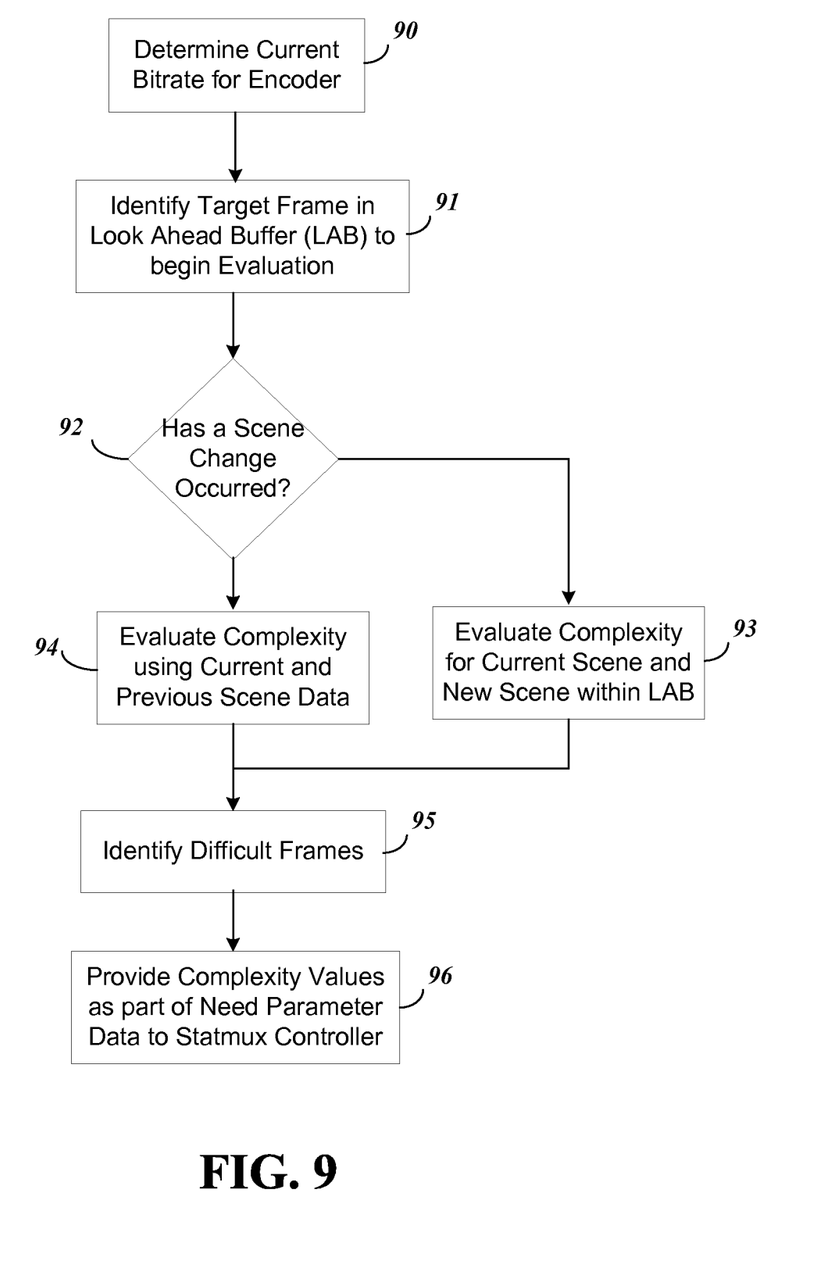
FIG. 9 provides a flow chart showing steps for determining complexity values used to provide a need parameter from an encoder when a scene change occurs.

First in part A of the code of Appendix B and in step 90 of FIG. 9, initial calculations are made to identify parameters for the current bit rate used for the encoder, whether or not a scene change occurs. In this process, the current coded ratio is retrieved from the Rate Controller (RC) of the encoder to identify the encoder's set standard bit ratio for the current fit complexity. Further, a target Decode Time Stamp (DTS) for beginning coding of future frames in the LAB is determined by using the Presentation Time Stamp (PTS) of the last frame captured. The target DTS is then fine tuned for best Video Quality (VQ).

Next in the code of Appendix B and in step 91 of FIG. 9, a target frame in the LAB is identified. The target frame is selected to allow enough time lag for sending NP data to the statmux controller and receiving bitrate control data back to control the bit rate. Several factors can affect the time lag. For example, inverse telecine data can require a significant lag from the beginning of the buffer to a target frame where obtained complexity data can be used to control bit rate. For inverse telecine, 30 frames of data can represent 38 frames, causing the encoding to significantly lag. Depending on the circumstances, the target frame can range from two or three frames in from the beginning of the buffer to ten frames or more in. The remaining size of the LAB is further determined to get an indication of the extent of the amount of data available in the LAB to measure data complexity.

Next in Appendix B and step 92 in FIG. 9, the data in the LAB is checked to determine if a scene change occurred. The data is evaluated from the target frame. If a scene change does occur, the data being evaluated to determine bit rate for the current scene may require a significantly different bit rate than the new scene after the scene change. Thus, if the scene change is detected, evaluation is made in step 93 of the new scene data as well as the current scene to determine complexity rather than relying on data only from the current scene. To ensure enough data is evaluated in the new scene to accurately determine its complexity, the data evaluated should be considered throughout the remainder of the LAB.

If a scene change is detected, data within the new scene is specifically evaluated for complexity beginning in the code of section B of Appendix B. Initially for the new scene after the scene change, a best estimate is made for the coded ratios for the new scene. To do this, the code initially looks at the I, P and B type pictures. All I pictures from a scene tend to code similarly, and the same is true for P and B type pictures. However, the I, P and B type pictures can individually code very differently, so it is important to group complexity calculations by picture type. To ensure such a grouping, the code in section B determines on average what percentage of the pictures will be I, P and B type. These percentages are then used when determining the overall complexity.

Next, in a step of the code labeled "avgsScores, Pic_type counts, and difficult frame counts" calculations are made to determine complexity values for the current scene and the new scene using the average scores, picture type counts and difficult frame counts. Note from the code labeled "Do not include statistics from a previous scene" that only the new and current scene are evaluated. Data from the "previous scene,"

where the previous scene is the scene immediately preceding the current scene is not included in the complexity determination.

Finally, in the code labeled "Using the standard GOP estimate if end of scene is not found or scene is longer than N" a limitation is made on the complexity evaluation. The limitation is based in part on the size of the LAB. If the entire scene does not fit within the LAB, the complexity determination is limited by the LAB size. Further if the length of the scene is longer than N, the maximum data that can be determined and provided to the statmux controller for the bit rate statistical analysis. N will be a limiting factor on the total complexity analysis.

The code in step C of Appendix B and in step 94 of FIG. 9, determines complexity values if no scene change is detected. In this code section, first a group of pictures (GOP) pattern is determined from the scene. Then the average scores from previous frames are propagated forward to the frame being evaluated to determine the complexity score for the current frame.

B. Difficult Frames

In one embodiment, the code further considers a particular class of "difficult frames." Detecting difficult frames is also illustrated at step 95 in FIG. 9. Difficult frames occur when a picture flashes, as when an explosion occurs or color or fades in and out from a previous picture. These "difficult" frames are bit intensive and much more complex to encode. In one embodiment of the system, the header of the difficult frame includes an identifier particularly labeling the frame as a difficult frame. This code in Appendix B used to identify and evaluate these difficult frames is provided next under heading "C" in the part labeled "Compute the number of difficult frames."

With a determination of difficult frames as well as complexity due to scene changes, the code of step D of Appendix B and step 96 of FIG. 9, determines the need parameter (NP) for a frame based on the determined complexity values. An initial temporary score for the frame is first set. Then, depending on whether the frame is an I or B type frame, the complexity values are provided to form the NP to provide to the statmux controller.

C. Stream Alignment (New Stuff)

In circumstances described to follow, the bitrate output allocated to the encoders to a time period can be misaligned with that time period, causing the bit output to exceed a maximum that will be accepted by components downstream from the encoders supplying the multiplexer. Bits can thus be dropped or left on the floor when such misalignment occurs. Code in C++ for preventing such misalignment is provided in Appendix C. Appendix C will be referenced in conjunction with the description to follow.

In one example statmux encoder, bit rates are allocated to the encoders in 2 msec time periods. A misalignment refers to when the bitrate allocations for a given 2 msec allocation is applied in the encoders during the wrong 2 msec time period. In some current devices, the bitrate allocation can be off by as much as 30 msec. So embodiments of the present invention take steps to ensure that the misalignment will not overflow the components downstream from the encoders over that 30 msec time. The multiplexer itself does not limit the total bandwidth for the muxed stream, but components such as buffers downstream from the encoders do. In the case of misalignment, for the multiplexer, rather than getting a perfectly multiplexed stream of 36 mbps, it will wavier a little bit when the bitrates are changing. In a perfect world with no misalignment between the streams from the encoders, no correction algorithm would be necessary.

To better understand the misalignment and how embodiments of the present invention can correct the misalignment, in a further example situation, assume four encoders are providing bits to a multiplexer. Assume a maximum of 20K bits are allocated in a 2 msec time period (referred to herein as time period 1). The four encoders are allocated bit rates for time period 1, as follows:
encoder 1: 10K
encoder 2: 5K
encoder 3: 5K
encoder 4: 0K Then in a second time 2 msec period following subsequent to the first (referred to herein as time period 2), according to a change in need, the bit rates for the four encoders are reallocated as follows:
encoder 1: 5K
encoder 2: 5K
encoder 3: 0K
encoder 4: 10K Now suppose the encoder 4 is misaligned and during time period 1 it jumps ahead to time period 2. Now the actual bit rate output during frame 1 will be as follows:
encoder 1: 10K
encoder 2: 5K
encoder 3: 5K
encoder 4: 10K The total bit rate output will then be 30K, which exceeds the 20K maximum output to the multiplier by 10K. In this case, 10K bits will be dropped.

Encoder misalignment will occur on occasion. In one example system with 2 msec bitrate entries, accuracy of a number of parameters at worst case was set to 5 msec (although 30 msec accuracies can be required as noted above). The 5 msec inaccuracies included the 2 msec video clock timestamp inaccuracy, a 2 msec clock smoothing of timestamps and a 1 msec ability to fix the TS delay.

As noted from the example above, there can be a significant change in bit rate from an encoder from time period to time period. For instance, encoder 4 jumped from 0K bits in frame 1 to 10K bits in frame 2. With such a significant change, when misalignment occurs, bits can be dropped. Accordingly, embodiments of the present invention limit the percentage increase of an encoder's output from time period to time period to prevent bits from being dropped when misalignment occurs.

Referring now to the code of Appendix C, a sample program is shown to limit the increase of an encoder's output from time period to time period. Initially the maximum buffer size is defined as 20K bits, following the above example where the multiplexer can receive a maximum of 20K bits in a 2 msec time period. Further, the maximum alignment error is set, here to 5 msec, also following the above example situation. Further, a sample period is set dividing the 2 msec time period selected into 90K bit segments. Further, with a maximum number of delay cycles desired determined, an accumulator step size to evaluate bit rate increase is identified.

Next, a maximum bitrate increase is defined based on the maximum packet buffer output and the accumulator step size. In an initialization and subsequent reconfiguration steps the maximum bitrate increase is adjusted based on downstream constraints such as the number of channels. Finally, the maximum bitrate for an encoder is set as the lesser of the previous channel bitrate or the previous bitrate plus the maximum bitrate increase when an increase is indicated in the need parameter provided from the encoder.

Figure 10:
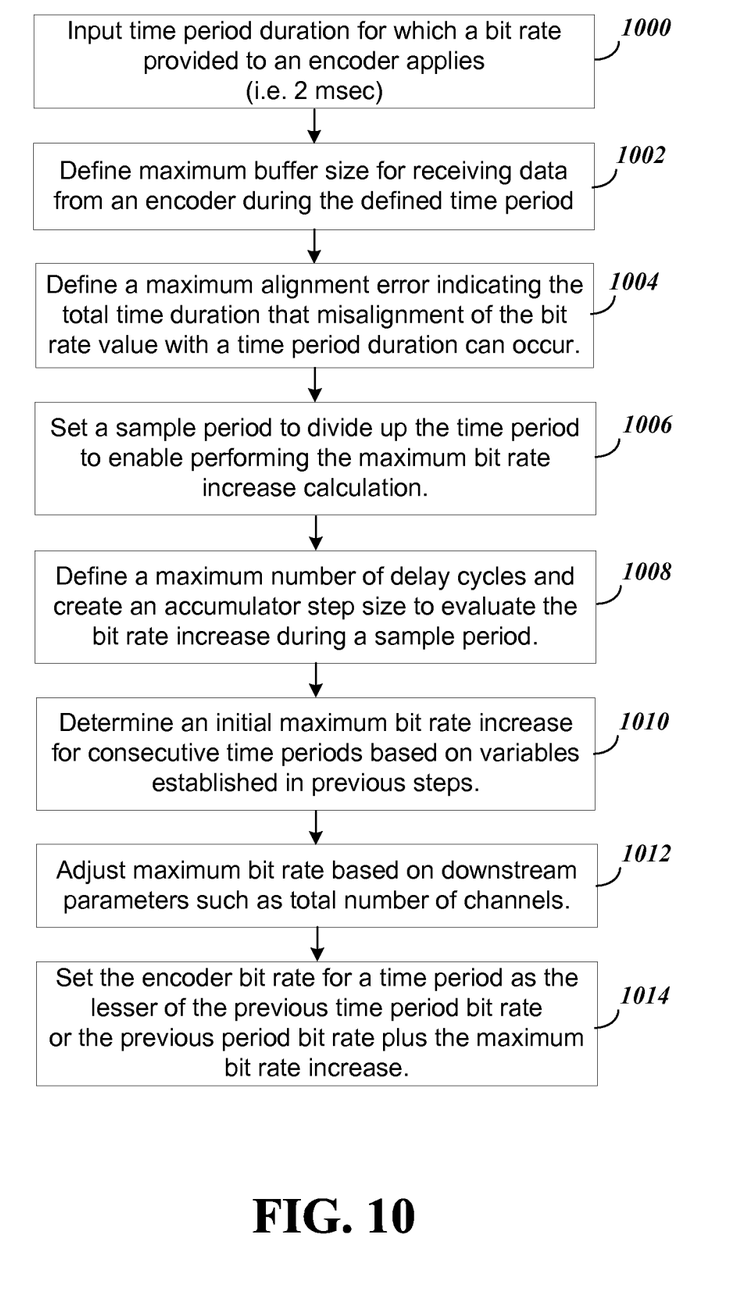
FIG. 10 a flow chart summarizing generally the steps to account for stream misalignment to prevent bits from being dropped.

FIG. 10 provides a flow chart summarizing generally the steps to account for stream misalignment to prevent bits from being dropped. Initially in step 1000 a time period duration that a bit rate value provided to the encoder applies is set, which may for example be 2 msec, as described above. Next in step 1002 a maximum buffer size for receiving bits from the encoders during the defined time period is determined. In step 1004 a maximum alignment error, indicating the total time duration that misalignment may occur is determined. As indicated above, this maximum alignment error may be as much 50 msec, or the length of multiple time period durations chained together.

Next in step 1006 to begin calculations to determine maximum bit rate increase, a sample period is set by dividing each time period, for example 2 msec as indicated above, into small segments. Next in 1008, a maximum number of delay cycles is determined, and an accumulator step size for evaluating bit rate increase during a sample period is created. In step 1010 the maximum bitrate increase is defined based on the maximum packet buffer output and the accumulator step size. In step 1012, the maximum bitrate increase is adjusted based on downstream constraints such as the number of channels. Finally, in step 1014 the bitrate for an encoder during a time period as the lesser of the previous time period bitrate or the previous bitrate plus the maximum bitrate increase when an increase is indicated in the need parameter provided from the encoder.

Although the present invention has been described above with particularity, this was merely to teach one of ordinary skill in the art how to make and use the invention. Many additional modifications will fall within the scope of the invention, as that scope is defined by the following claims.

APPENDIX A

Statmus Bitrate Allocation Determination (C++)

```
bits_to_allocate = totalBitrate;
totalNP = 0;
// Compute the total NP and assign minBitrate to all channels.
for (each channel pCh)
```

APPENDIX A-continued

Statmus Bitrate Allocation Determination (C++)

```
    pCh->localMaxBitrate = MIN(pCh->maxBitrate,
                               pCh->bitrate + maxIncrease);
    if ((pCh->state == ACTIVE) && <current NP data>){
        bits_to_allocate -= pCh->minBitrate;
        pCh->bitrate = pCh->minBitrate;
        if (pCh->bitrate < pCh->localMaxBitrate)
            totalNP += pCh->np.needParameter;
    }
} else {
        bits_to_allocate -= pCh->nomBitrate;
        pChannel->bitrate = pCh->nomBitrate;
}
// Allocate remaining bits based on complexity
// Looping to handle case where channels hit max bitrate.
iterations = 0;
while ((bits_to_allocate > numChannels*2) &&
                (iterations < numChannels-1)) {
    totalBits = 0;
    totalNP2 = totalNP = MAX(1, totalNP);
    for (each channel pCh) {
        if ((pCh->state == ACTIVE) &&<current NP data>)) {
            if (pCh->bitrate < pCh->localMaxBitrate) {
                pCh->bitrate += (UINT32)(((uint64)pCh->np.-
                needParameter
                    * (uint64)bits_to_allocate ) / (uint64)totalNP);
                pCh->bitrate = MIN(pCh->bitrate, pCh->localMaxBitrate);
                totalBits += pCh->bitrate;
                if (pCh->bitrate == pCh->localMaxBitrate)
                    totalNP2 -= pCh->np.needParameter;
            } else {
                totalBits += pCh->bitrate;
            }
        }
    }
    bits_to_allocate = (totalBitrate - totalBits);
    if (totalNP2 == totalNP) break;
    totalNP = totalNP2;
    iterations++;
}
```

APPENDIX B

Statmus Encoder Need Parameter Calculation (C++)

```
// A. Initial Calculations
// Grab the current coded_ratio from RC.
        coded_ratio[i] = rc->coded_ratio[i];
// Determine the targetDTS by using the
// PTS of the last frame captured.
        if (60fps) {
            targetDTS = DXT_VCAP_PTS - 67252 + 500;
            max_history = 10;
        } else {
            targetDTS = DXT_VCAP_PTS - 133635 + 500;
            max_history = 5;
        }
// This number was fine tuned for best VQ.
        targetDTS += 5*3003;
// Find the target frame in the LAB.
        for (i=0;i<lab_length;i++) {
            LABframe = gop->LAB[i];
            delta = LABframe->u64DTS - targetDTS;
            if (delta > 0xF0000000)
                break;
        }
// Determine the size of the lookahead buffer remaining.
        if (i < lab_length) {
            frame = gop->LAB[i];
            lab_length = i;
        }
// Check for a scene change up to and including the target frame.
        if (frame->b8scene_change) {
            scene_change = TRUE;
            sc_loc = i;
        } else {
```

APPENDIX B-continued

Statmus Encoder Need Parameter Calculation (C++)

```cpp
            for (;i<gop->u8LAB_length; i++) {
                LABframe = gop->LAB[i];
                if (LABframe->b8scene_change) {
                    scene_change = TRUE;
                    sc_loc = i;
                    break;
                }
            }
            if (!scene_change && orig_frame->b8scene_change) {
                scene_change = TRUE;
                sc_loc = gop->u8LAB_length;
            }
        }
    }
// B. Scene Change Stats Collection
// Determine best estimate for the coded ratios of the new scene.
int ratioI = RC_CODED_RATIO_I;
int ratioP = RC_CODED_RATIO_P;
int ratioB = RC_CODED_RATIO_B;
if (rc->vbv < (rc->VBVMax>>1))
{
    ratioI += 10*1024;
    ratioP += 20*1024;
    ratioB += 15*1024;
}
if (coded_ratio[INTRA_IMG]    > (ratioI<<1))
    coded_ratio[INTRA_IMG]    = ratioI;
if (coded_ratio[INTER_IMG]    > (ratioP<<1))
    coded_ratio[INTER_IMG]    = ratioP;
if (coded_ratio[B_IMG]        > (ratioB<<1))
    coded_ratio[B_IMG]        = ratioB;
if (coded_ratio[INTRA_IMG]    < ratioI)
    coded_ratio[INTRA_IMG]    = ratioI;
if (coded_ratio[INTER_IMG]    < ratioP)
    coded_ratio[INTER_IMG]    = ratioP;
if (coded_ratio[B_IMG]        < ratioB)
    coded_ratio[B_IMG]        = ratioB;
// Initialization
avgScore[INTRA_IMG]
avgScore[INTER_IMG] = 0;
avgScore[B_IMG] = 0;
N = 1;NI = 1;NP = 0;NB = 0;
// Compute avgScores, pic_type counts, and difficult frame counts
if (sc_loc == gop->u8LAB_length) {
    avgScore[INTRA_IMG] = orig_frame->u32ScoreIntra>>1;
    if (RC_DifficultFrame(orig_frame))
        difficulty++;
} else {
    avgScore[INTRA_IMG] = gop->LAB[sc_loc]->u32ScoreIntra>>1;
    if (RC_DifficultFrame(gop->LAB[sc_loc]))
        difficulty++;
}
for (i=sc_loc-1; i>=0 ;i--) {
    LABframe = gop->LAB[i];
    if (RC_DifficultFrame(LABframe))
        difficulty++;
    // Do not include statistics from the previous scene.
    if ((LABframe->u8ptype == INTRA_IMG) ||
                        LABframe->b8scene_change) {
        break;
    } else {
        N++;
        Score = Max(1, Min(LABframe->u32ScoreIntra>>1 ,
                        LABframe->pstMEFrameInfo->u32ScoreInter));
        if (LABframe->u8ptype == INTER_IMG) {
            NP++;
            if (avgScore[INTER_IMG] == 0) {
                avgScore[INTER_IMG] = Score+1;
            } else {
                avgScore[INTER_IMG] = (Score+avgScore[INTER_IMG])/2 + 1;
            }
        } else {
            NB++;
            if (avgScore[B_IMG] == 0) {
                avgScore[B_IMG] = Score+1;
        } else {
            avgScore[B_IMG] = (Score+avgScore[B_IMG])/2 + 1
        }
```

APPENDIX B-continued

Statmus Encoder Need Parameter Calculation (C++)

```
    }
}
rc->statmux.avgScore[INTRA_IMG] = avgScore[INTRA_IMG];
rc->statmux.avgScore[INTER_IMG] = avgScore[INTER_IMG];
rc->statmux.avgScore[B_IMG] = avgScore[B_IMG];
//Using the standard GOP estimate for this scene if end of scene
// is not found or the scene is longer the N.
if ((i < 0) || (N > gop->u32N)) {
    N = gop->u32N;
    NI = 1;
    NP = (N + (frame->u8M-1))/ frame->u8M;
    NB = N - NP;
    NP -= NI;
}
// C. No Scene Change Stats Calculation
// Determine the GOP pattern.
NI = 1;
NP = (N + (frame->u8M-1))/ frame->u8M;
NB = N - NP;
NP -= NI;
// Propogate the avgScores forward to the frame we are evaluating.
if (!recon->b8scene_change) {
    Score = recon->u32ScoreIntra>>1;
    if (recon->u8ptype!=INTRA_IMG)
        Score = Min(Score , recon->pstMEFrameInfo->u32ScoreInter);
    rc->statmux.avgScore[recon->u8ptype] =
        ((Score + rc->statmux.avgScore[recon->u8ptype])/2) + 1;
}
avgScore[INTRA_IMG] = rc->statmux.avgScore[INTRA_IMG];
avgScore[INTER_IMG] = rc->statmux.avgScore[INTER_IMG];
avgScore[B_IMG] = rc->statmux.avgScore[B_IMG];
for (i=gop->u8LAB_length;i>lab_length;i--) {
    LABframe = gop->LAB[i];
    Score = LABframe->u32ScoreIntra>>1;
    if (LABframe->u8ptype != INTRA_IMG)
        Score = Min(Score, LABframe->pstMEFrameInfo->u32ScoreInter);
    avgScore[LABframe->u8ptype] =
        ((Score + avgScore[LABframe->u8ptype])/2) + 1;
}
// Compute the number of difficult frames.
for (i=lab_length;i>lab_length-N;i--) {
    LABframe = gop->LAB[i];
    if (RC_DifficultFrame(LABframe))
        difficulty++;
}
// D. Need Parameter Calculation
Score = frame->u32ScoreIntra>>1;
tmp = (100*Score) / avgScore[INTRA_IMG];
ftmp1 = 9 * tmp + 100;
ftmp2 = tmp + 900;
rc->statmux.scale2_x1000 = MPEG2_MulDiv64(ftmp1, 1000, ftmp2);
rc->statmux.scale2_x1000 = Max(850, rc->statmux.scale2_x1000);
if (frame->u8ptype!=INTRA_IMG)
    Score = Min(Score , frame->pstMEFrameInfo->u32ScoreInter);
tmp = (100*Score) / avgScore [frame->u8ptype];
ftmp1 = 9 * tmp + 100;
ftmp2 = tmp + 900;
rc->statmux.scale1_x1000 = MPEG2_MulDiv64(ftmp1, 1000, ftmp2);
rc->statmux.scale1_x1000 = Max(1000, rc->statmux.scale1_x1000);
if (frame->u8ptype == INTRA_IMG) {
    ftmp =
        NI*((coded_ratio[INTRA_IMG]>>3)*(avgScore[INTRA_IMG]>>10))/N +
        NP*((coded_ratio[INTER_IMG]>>3)*(avgScore[INTER_IMG]>>10))/N +
        NB*((coded_ratio[B_IMG]>>3)*(avgScore[B_IMG]>>10))/N;
    tmp = MPEG2_MulDiv64(rc->statmux.scale1_x1000, ftmp, 1000);
} else if (frame->u8ptype == INTER_IMG) {
    ftmp =
        NI*((coded_ratio[INTRA_IMG]>>3)*(avgScore[INTRA_IMG]>>10))/N;
    ftmp1 = MPEG2_MulDiv64 (rc->statmux.scale2_x1000, ftmp, 1000);
    ftmp =
        NP*((coded_ratio[INTER_IMG]>>3)*(avgScore[INTER_IMG]>>10))/N;
    tmp = MPEG2_MulDiv64(rc->statmux.scale1_x1000, ftmp, 1000);
    tmp += NB*((coded_ratio[B_IMG]>>3)*(avgScore[B_IMG]>>10))/N;
    tmp += ftmp1;
} else if (frame->u8ptype == B_IMG) {
    ftmp =
        NI*((coded_ratio[INTRA_IMG]>>3)*(avgScore[INTRA_IMG]>>10))/N;
    ftmp1 = MPEG2_MulDiv64(rc->statmux.scale2_x1000, ftmp, 1000);
```

APPENDIX B-continued

Statmus Encoder Need Parameter Calculation (C++)

```
        ftmp = NB*((coded_ratio[B_IMG]>>3)*(avgScore[B_IMG]>>10))/N;
        tmp = MPEG2_MulDiv64(rc->statmux.scale1_x1000, ftmp, 1000);
        tmp += NP*((coded_ratio[INTER_IMG]>>3)*(avgScore[INTER_IMG]>>10))/N;
            tmp += ftmp1;
    }
    NeedParam = MPEG2_MulDiv64(tmp, rc->frame_rate_x1001, 30030);
    NeedParam >>= SD_HD_DIVISION_SHIFT;
```

APPENDIX C

```
Sream Alignment—Limiting Bitrate Increase (C++)
#define MAX_PACKET_BUFFER    20
#define MAX_ALIGNMENT_ERROR  450   // 5msec in 90KHz Ticks
sample_period = 180 // 2ms in 90KHz Ticks;
max_cycles_of_delay = (MAX_ALIGNMENT_ERROR/
sample_period) + 1 = 3
accum_steps = 0;
for (i=1;i<=max_cycles_of_delay;i++)
accum_steps+= i;
So accum_steps = 6.
max_bitrate_increase = (MAX_PACKET_BUFFER*188*8) /
accum_steps;
So max_bitrate_increase = 5013
Init and Reconfiguration Step:
max_bitrate_increase_adj = max_bitrate_increase /
(pGroup->numChannels – 1);
Replace maxBitrate in the bitrate allocation with this:
max_bitrate = Min(pChannel->maxBitrate, pChannel->prevBitrate +
max_bitrate_increase_adj)
```

What is claimed:

1. A method for allocating bits in a statistical multiplexer comprising:
   allocating a first bit rate allowed for the output of each of a plurality of encoders supplying a multiplexer during a first time period;
   determining a bit rate increase from the first bit rate for each of the encoders; and
   allocating a second bit rate allowable to each of the encoders for a second time period, subsequent to the first time period, wherein the second bit rate is limited by the determined bit rate increase,
   wherein misalignment of application of the second bit rate to a given one of the encoders can cause the second bit rate output to be provided in the first time period by the given encoder, and
   wherein the bit rate increase is determined so that when the misalignment of the second bit rate can occur for the second bit rate to be output in the first time period, the bit rate increase is set so that a total number of bits processed by the given encoder using the second rate does not exceed the encoder capacity that will cause bits to be dropped by the multiplexer.

2. The method of claim 1, wherein the bit rate increase is a percentage of the first bit rate.

3. The method of claim 1, wherein the bit rate increase is applied when inverse telecine frames are being processed.

4. The method of claim 1, wherein the first time period and the second time period are defined by a number of sample periods, and the bit rate increase is defined by a size of one of the sample periods and a size of a packet buffer providing bits to the multiplexer.

5. The method of claim 1, wherein the bit rate increase is further defined by a predetermined maximum allowable alignment error.

6. A statistical multiplexing system comprising:
   encoders for coding a plurality of channels of video data sources;
   a multiplexer for receiving the output of the encoders and providing from the output of the encoders a single data stream; and
   a statistical multiplexer (statmux) controller for receiving need parameter data from the encoders and for providing to the encoders bit rate data based on the need parameter data, the statmux controller including a memory storing code to enable the statmux controller to:
      allocate a first bit rate allowed for the output of each of the encoders supplying the multiplexer during a first time period;
      determining a bit rate increase from the first bit rate for each of the encoders; and
      allocating a second bit rate allowable to each of the encoders for a second time period, subsequent to the first time period, wherein the second bit rate is limited by the determined bit rate increase,
      wherein misalignment of application of the second bit rate to a given one of the encoders can cause the second bit rate output to be provided in the first time period by the given encoder, and
      wherein the bit rate increase is determined so that when the misalignment of the second bit rate can occur for the given encoder to cause the second bit rate to be output in the first time period, the bit rate increase is set so that a total number of bits processed by the given encoder using the second rate does not exceed the encoder capacity that will cause bits to be dropped by the multiplexer.

7. The statistical multiplexing system of claim 6, wherein the bit rate increase is a percentage of the first bit rate.

8. The statistical multiplexing system of claim 6, wherein the bit rate increase is applied when inverse telecine frames are being processed.

9. The statistical multiplexing system of claim 6, wherein the first time period and the second time period are defined by a number of sample periods, and the bit rate increase is defined by a size of one of the sample periods and a size of a packet buffer providing bits to the multiplexer.

10. The statistical multiplexing system of claim 6, wherein the bit rate increase is further defined by a predetermined maximum allowable alignment error.

11. A non-transitory computer readable medium containing an executable program to enable a controller in of a statistical multiplexer (statmux) system that provides a bit rate signal to a plurality of encoders in the statmux system, the program causing controller to:
   allocate a first bit rate allowed for the output of each of a plurality of encoders supplying a multiplexer during a first time period;
   determine a bit rate increase from the first bit rate for each of the encoders; and allocate a second bit rate allowable to each of the encoders for a second time period, subsequent to the first time period, wherein the second bit rate is limited by the determined bit rate increase, wherein misalignment of application of the second bit rate to a given one of the encoders can cause the second bit rate output to be provided in the first time period by the given encoder, and wherein the bit rate increase is determined so that when the misalignment of the second bit rate can occur for the given encoder to cause the second bit rate to be output in the first time period, the bit rate increase is set so that a total number of bits processed by the given encoder using the second rate does not exceed the encoder capacity that will cause bits to be dropped by the multiplexer.

12. The non-transitory computer readable medium of claim 11, wherein the first time period and the second time period are defined by a number of sample periods, and the bit rate increase is defined based on a size of one of the first and second sample periods.

13. The non-transitory computer readable medium of claim 11, wherein the bit rate increase is further defined by a predetermined maximum allowable alignment error.

\* \* \* \* \*